United States Patent [19]
Wu

[11] Patent Number: 6,104,760
[45] Date of Patent: *Aug. 15, 2000

[54] PEAK VOLTAGE REDUCTION ON DMT LINE DRIVER

[75] Inventor: Song Wu, Plano, Tex.

[73] Assignee: Texas Instruments Incorporated, Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/996,726

[22] Filed: Dec. 23, 1997

Related U.S. Application Data

[60] Provisional application No. 60/034,350, Dec. 23, 1996.

[51] Int. Cl.[7] .............................. H04K 1/02; H04L 25/03; H04L 25/49
[52] U.S. Cl. .......................... 375/296; 455/296; 327/309
[58] Field of Search ................................ 375/296, 377, 375/257; 370/481; 327/58, 62, 306, 309, 310; 455/296, 295

[56] References Cited

U.S. PATENT DOCUMENTS

| | | | |
|---|---|---|---|
| 5,623,513 | 4/1997 | Chow et al. | 375/219 |
| 5,787,113 | 7/1998 | Chow et al. | 375/219 |
| 5,790,550 | 8/1998 | Peeters et al. | 370/480 |
| 5,835,536 | 11/1998 | May et al. | 375/316 |

*Primary Examiner*—Chi H. Pham
*Assistant Examiner*—Bryan Webster
*Attorney, Agent, or Firm*—Warren L. Franz; Wade James Brady, III; Frederick J. Telecky, Jr.

[57] ABSTRACT

A clipping protection scheme for a discrete multi-tone (DMT) digital subscriber loop modem telecommunications system determines the occurrence of clipping by checking the overflow bits in the IFFT status register. The transmitter then sends a predefined data stream to notify the receiver of the event, and then breaks the data into two frames for consecutive transmission to the receiver.

18 Claims, 1 Drawing Sheet

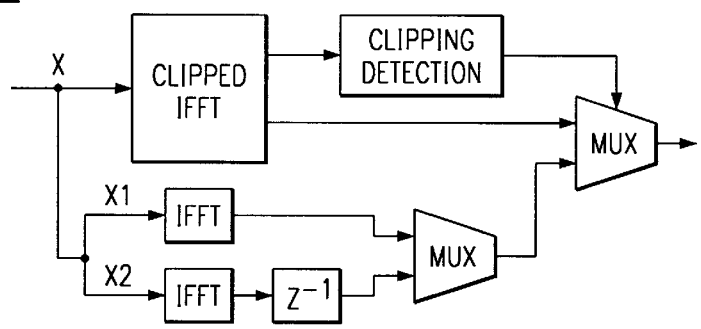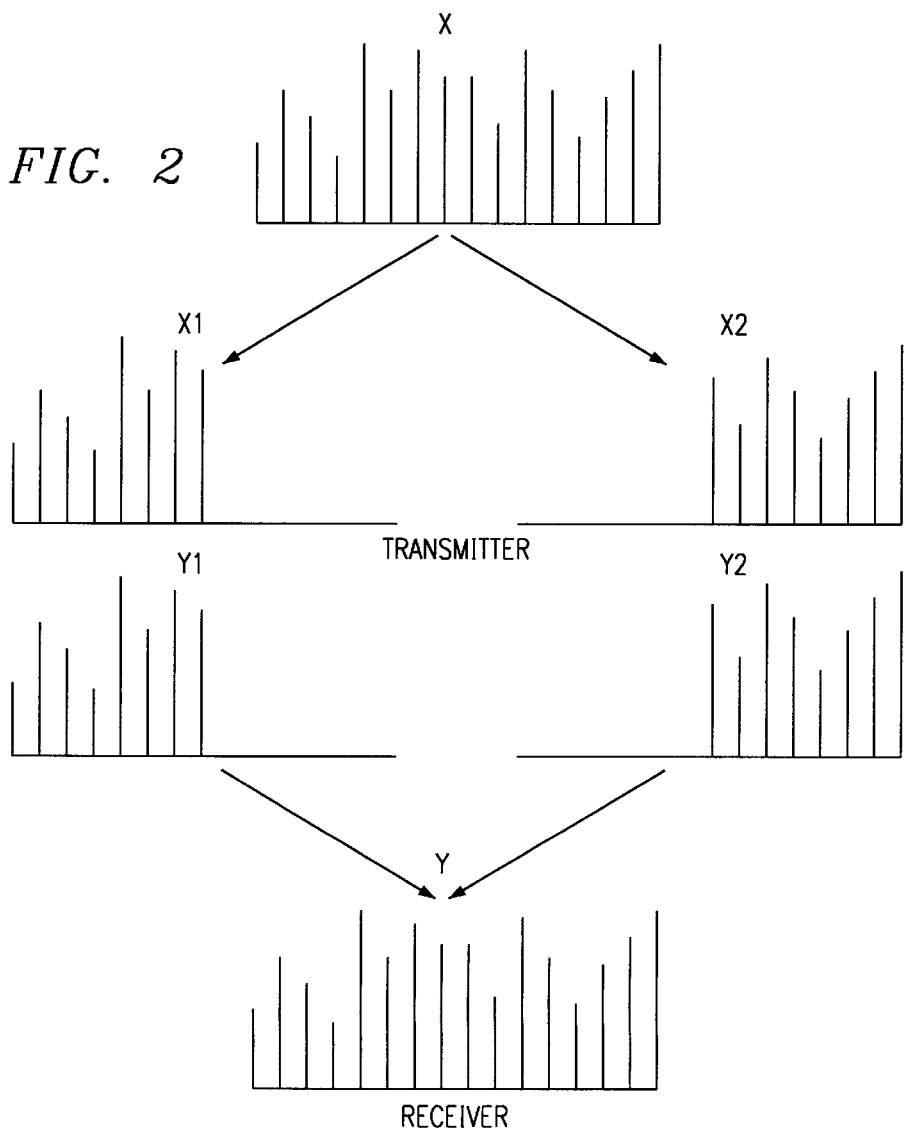

PEAK VOLTAGE REDUCTION ON DMT LINE DRIVER

This application claims priority under 35 U.S.C. §119(e)(1) of provisional U.S. Ser. No. 60/034,350 filed Dec. 23, 1996, entitled "Peak voltage Reduction on DMT Line Driver," the entirety of which is incorporated herein by reference.

This invention relates generally to data communication and, in particular, to discrete multi-tone (DMT) digital subscriber line modem communications.

BACKGROUND OF THE INVENTION

Discrete multi-tone (DMT) has proved to be a computationally efficient modulation scheme on benchmark testing. However, since peak voltage for DMT is very high, it requires a high voltage analog line driver and therefore increases the cost of analog front end and power consumption. The problem stems from transmitter inverse FFT operation. For the FFT process $$X(k) = \frac{1}{\sqrt{N}} \sum_{n=0}^{N-1} x_n \cdot \exp\left(-j\frac{2\pi nk}{N}\right), \qquad (1)$$

the theoretical voltage peak-to-average ratio for FFT can be approximated as $PA=\sqrt{N}$. For a large block of operation, e.g. N=512, the peak-to-average ratio will be $PA \approx 22$. This ratio is too high to design a low cost analog line driver. In the typical practical implementation, people have to clip the signal level to reduce line driver voltage. The clipping effect causes impulse noise and degrades the performance. For example in the application of internet access, since TCP/IP protocol requires retransmission and the clipping impulse noise is intrinsic for the specific bad frame, it will cause severe problems without error control. For example, if a frame cannot pass the network the first time due to the clipping, the retransmission protocol will ask it to transmit again. However, since the same frame clips again, it fails the second time again. The process thus repeats again and again in a loop and jams the traffic forever. To avoid the impulse noise degradation, deep interleave and Reed-Solomon error correction coding have to be added to the system. Consequently it requires additional memory. This certainly offsets the computation advantage taken from the modulation technique.

SUMMARY OF THE INVENTION

The invention provides a simple method to reduce the voltage requirement in a DMT digital subscriber loop modem system, without degrading the performance.

In accordance with the present invention, a clipping protection procedure is provided for discrete multi-tone (DMT) digital subscriber loop modem telecommunication systems which determines the occurrence of clipping by checking the overflow bits in the inverse fast Fourier transform (IFFT) status register. The transmitter then sends a predefined data stream to notify the receiver of the sensed clipping and then breaks the data being transmitted into two frames for consecutive transmission to the receiver whereby clipping is avoided. In this manner, the system operates in normal mode except during periods when clipping takes place, during which periods data transmission speed is reduced to avoid further clipping.

BRIEF DESCRIPTION OF THE DRAWINGS

Embodiments of the invention have been chosen for purposes of illustration and description and are described with reference to the accompanying drawings, wherein:

FIG. 1 is a block diagram of an implementation of the clipping protection scheme at the transmitter of a DMT line driver in accordance with the invention.

FIG. 2 illustrates the frame splitting mechanism.

DETAILED DESCRIPTION OF PREFERRED EMBODIMENTS

For a 512 point FFT, the distribution of the output signal can be approximated as a Gaussian distribution $$p(x) = \frac{1}{\sqrt{2\pi}\sigma} \exp(-x^2/\sigma^2), \qquad (2)$$

where s is the root mean square (rms). Assuming the clipping level is $t \cdot \sigma$, then the probability of clipping is $$\begin{aligned} p &= 2 \cdot \int_{t\sigma}^{\infty} p(x) \cdot dx \\ &= \mathrm{erfc}(t) \end{aligned} \qquad (3)$$

Table 1 shows some calculated clipping probabilities as a function of t. It is easy to observe that if t=3 or above, the clipping probability is in the range of $10^{-5}$. Although it rarely happens, it will cause severe problems for applications. This invention uses a clipping protection scheme rather than deep interleave and Reed-Solomon coding to prevent performance degradation. A functional block diagram of an implementation is shown in FIG. 1. At the transmitter side, for the DSP implementation of the IFFT, instead of right shifting and saving data for each stage, right shifting and saving is done only for the first few stages to get a desired peak-to-average ratio t. This process leads to a clipped version of the IFFT. After the IFFT can be detected by checking for a clipping event via the overflow bits in the status register (clipping detection). If clipping happens, the transmitter sends a special predefined data instead of clipped data to notify the receiver of the occurrence. At the same time, the transmitter breaks the incoming data frame into two frames for consecutive two frame transmission. The format of breaking one frame into two frames can be predefined as shown in FIG. 2. At the receiver side, once the clipping informing frame has been detected, the receiver will repack the subsequent two frames of data into one frame according to the predefined format. This process necessitates occasionally introducing one extra frame for clipping protected transmission. However, since the probability of clipping occurrence is only about $10^{-5}$, the overhead is also just about $10^{-5}$, which is less than the overhead for any practical Reed-Solomon coding scheme.

| T | p |
| --- | --- |
| 1.0 | $1.6 \times 10^{-1}$ |
| 1.5 | $3.4 \times 10^{-2}$ |
| 2.0 | $4.7 \times 10^{-3}$ |
| 2.5 | $4.1 \times 10^{-4}$ |
| 3.0 | $2.2 \times 10^{-5}$ |
| 3.5 | $7.4 \times 10^{-7}$ |
| 4.0 | $1.5 \times 10^{-8}$ |
| 4.5 | $2.0 \times 10^{-10}$ |

Those skilled in the art to which the invention relates will appreciate that various substitutions and modifications may be made to the foregoing embodiments, without departing from the spirit and scope of the invention as defined in the claims.

What is claimed is:

1. A method of reducing peak voltage on a DMT line driver which comprises the steps of:

(a) checking incoming data for clipping;

(b) responsive to detection of said clipping, breaking said data to be clipped into a plurality of predefined unclipped frames and sending a message to a receiver for said data indicative of said detection and of said predefinition of said frames;

(c) sending said predefined frames of data to a receiver; and (d) converting said predefined frames of data back to said original incoming data at said receiver.

2. The method of claim 1 further including the step of providing a digital signal processor for checking said incoming data for clipping.

3. The method of claim 1 wherein said step of breaking said data into a plurality of predefined frames comprises two frames and sending said data from said frames in multiplexed manner.

4. The method of claim 2 wherein said step of breaking said data into a plurality of predefined frames comprises two frames.

5. The method of claim 1 further including the step of determining the peak to average voltage ratio of said incoming data prior to said step of checking for clipping to provide a clipping level.

6. The method of claim 2 further including the step of determining the peak to average voltage ratio of said incoming data prior to said step of checking for clipping to provide a clipping level.

7. The method of claim 3 further including the step of determining the peak to average voltage ratio of said incoming data prior to said step of checking for clipping to provide a clipping level.

8. The method of claim 4 further including the step of determining the peak to average voltage ratio of said incoming data prior to said step of checking for clipping to provide a clipping level.

9. The method of claim 1 further including the step of adding an extra frame for clipping protected transmission.

10. The method of claim 9 further including the step of adding an extra frame for clipping protected transmission.

11. A system for reducing peak voltage on a DMT line driver which comprises:

(a) circuitry for checking incoming data for clipping;

(b) circuitry responsive to detection of clipping for breaking said data to be clipped into a plurality of predefined unclipped frames and sending a message to a receiver for said data indicative of said detection and of said predefinition of said frames;

(c) circuitry for sending said predefined frames of data to a receiver; and (d) circuitry at said receiver for converting said predefined frames of data back to said original incoming data at said receiver.

12. The system of claim 11 further including a digital signal processor for checking said incoming data for clipping.

13. The system of claim 11 wherein said plurality of predefined frames comprises two frames and circuitry for sending said data from said frames in multiplexed manner.

14. The system of claim 12 wherein said plurality of predefined frames comprises two frames and circuitry for sending said data from said frames in multiplexed manner.

15. The system of claim 11 further including circuitry for determining the peak to average voltage ratio of said incoming data prior to checking for clipping to provide a clipping level for said circuitry for checking for clipping.

16. The system of claim 12 further including circuitry for determining the peak to average voltage ratio of said incoming data prior to checking for clipping to provide a clipping level for said circuitry for checking for clipping.

17. The system of claim 13 further including circuitry for determining the peak to average voltage ratio of said incoming data prior to checking for clipping to provide a clipping level for said circuitry for checking for clipping.

18. The system of claim 14 further including circuitry for determining the peak to average voltage ratio of said incoming data prior to checking for clipping to provide a clipping level for said circuitry for checking for clipping.

* * * * *